United States Patent
Schenk et al.

[11] Patent Number: 5,944,375
[45] Date of Patent: Aug. 31, 1999

[54] MOVABLE ROOF CONSTRUCTION FOR AN OPEN PASSENGER CAR

[75] Inventors: Bernhard Schenk, Boeblingen; Juergen Schrader, Weil im Schoenbuch; Eckart Schuler, Sindelfingen, all of Germany

[73] Assignee: Daimler-Benz Aktiengesellschaft, Germany

[21] Appl. No.: 08/918,140

[22] Filed: Aug. 27, 1997

[30] Foreign Application Priority Data

Aug. 27, 1996 [DE] Germany ............. 196 34 511

[51] Int. Cl.⁶ ........................................... B60J 7/19
[52] U.S. Cl. ................... 296/108; 292/DIG. 5; 296/120.1; 296/121
[58] Field of Search ................ 296/107.09, 108, 296/116, 118, 120.1, 122, 121; 292/DIG. 5

[56] References Cited

U.S. PATENT DOCUMENTS

| | | | |
|---|---|---|---|
| 1,334,382 | 3/1920 | Kunz | 296/120.1 |
| 2,079,232 | 5/1937 | Smith | 296/120.1 |
| 2,382,635 | 8/1945 | Humer | 296/120.1 |
| 5,031,957 | 7/1991 | Claar et al. | 296/108 |
| 5,338,085 | 8/1994 | Guckel et al. | 296/121 |

FOREIGN PATENT DOCUMENTS

| | | |
|---|---|---|
| 94 16 155 | 1/1995 | Germany . |
| 44 15 969 A1 | 11/1995 | Germany . |
| 44 45 580 C1 | 12/1995 | Germany . |
| 5-507454 | 10/1993 | Japan . |
| 6-286471 | 10/1994 | Japan . |
| 2267063 | 11/1993 | United Kingdom ............. B60J 7/185 |

*Primary Examiner*—D. Glenn Dayoan
*Assistant Examiner*—Paul Chenevert
*Attorney, Agent, or Firm*—Evenson, McKeown, Edwards & Lenahan, P.L.L.C.

[57] ABSTRACT

A movable roof construction for an open or convertible passenger car with a two-part foldable hardtop. To prevent the occurrence of wind noises in the area of the bordering of the two hardtop parts, a locking mechanism is provided between the two parallelogram control arms on each side of the parallelogram linkage. The locking mechanism is restrictedly coupled by transmission devices to the locking device of the forward roof part on the windshield cross member. Thereby, for a release of the parallelogram control arms, the locking mechanism can be unlocked together with an unlocking of the locking device.

7 Claims, 4 Drawing Sheets

MOVABLE ROOF CONSTRUCTION FOR AN OPEN PASSENGER CAR

BACKGROUND AND SUMMARY OF THE INVENTION

This application claims the priority of German application 196 34 511.1, the disclosure of which is expressly incorporated by reference herein.

The present invention relates to a movable roof construction for an open passenger car, i.e. convertible, having a forward, dimensionally stable roof part and a rearward dimensionally stable roof part. The rearward roof part is swivellable between a closed operative position and an open inoperative position. The forward roof part is displaceable by way of a double-sided parallelogram linkage between a closed operative position and an opened inoperative position. The linkage has a rearward parallelogram control arm arranged on each side of the open passenger car as a fixed component of the rearward roof part, and the forward roof part is fixable by way of a locking device on a windshield cross member of the vehicle body.

DE 44 45 580 C1 describes a roof construction in which the convertible has a forward, dimensionally stable roof shell as well as a rearward, dimensionally stable roof shell in which a rear window is integrated. A parallelogram linkage has one parallelogram control arm fixedly connected on each vehicle side with the rearward roof shell, so that the rearward roof shell is lowered into a storage space in the rear area of the convertible. Simultaneously, the forward roof shell is displaced in parallel toward the rear such that it is lowered onto the rearward roof shell. The roof construction is therefore folded together in its lowered inoperative position in the storage space. In the closed operative position, the two roof shells form a closed coupe roof, the forward roof shell being fixed by a locking device on a windshield cross member of the vehicle body above a windshield. Particularly at higher driving speeds, unpleasant wind noises may occur in the area of the bordering between the forward roof shell and the rearward roof shell.

It is an object of the present invention to provide a roof construction in which wind noises are reliably prevented, particularly at higher driving speeds.

This object has been achieved in accordance with the present invention by providing a locking mechanism between two parallelogram control arms on each side of the parallelogram linkage. The locking mechanism is coupled in a controlled manner by transmission devices on the locking device of the forward roof part on the windshield cross member such that the locking mechanism can be unlocked for a release of the parallelogram control arms together with an unlocking of the locking device.

The foregoing solution according to the present invention was based on the recognition that the wind noises in the area of the bordering between the forward and the rearward roof part arise because of a gap which occurs at high driving speeds as a result of the forming vacuum. The solution according to the present invention prevents, in the closed operative position of the roof construction, any relative movement between the two parallelogram control arms on each side of the parallelogram linkage. Thereby a gap formation and thus also the occurrence of wind noises are reliably avoided.

Because the locking mechanism on each side of the parallelogram linkage in a particularly advantageous manner by way of corresponding transmission devices is coupled in a controlled fashion directly with the locking device of the forward roof part on the windshield cross member, no separate drive is required for operating the locking mechanism. The locking mechanism is coupled by the transmission devices such with the respective unlocking or locking operations of the locking device that an unlocking of the locking device automatically also ensures an unlocking of the locking mechanism. Inversely, a locking of the locking device automatically causes a locking of the adjacent parallelogram control arms by the locking mechanism.

As transmission devices between the locking device and the locking mechanism situated away therefrom, either tension devices or pressure devices or combined tension/pressure devices can be provided. Correspondingly designed Bowden cables can be provided as tension, pressure or combined tension/pressure devices.

According to yet another feature of the present invention, a locking pin can be assigned to the one parallelogram control arm as well as a catch which is longitudinally displaceable on the other parallelogram control arm and which, by way of a hook extension in the locked condition, reaches behind the locking pin and constitute as the locking mechanism between the two parallelogram control arms. This is a particularly simple and nevertheless operationally reliable further development.

A still further feature of the present invention is a cable pull, which is coupled to the locking device of the forward roof part, serving as a transmission device for each locking catch. A restoring spring is assigned to each locking catch which loads the locking catch in the locking direction. The cable pull is therefore used as a pure tension device which couples the locking catch for the opening movement, that is, the unlocking movement, to the locking device of the forward roof part. The restoring spring causes the automatic restoring of the locking catch into its locking position as soon as the locking catch is no longer loaded by the cable pull in the opening direction. The restoring of the locking catch is an exclusive function of the spring force of the restoring spring so that, even if corresponding hydraulic or electrohydraulic movement drives for the roof construction fail, a locking of the locking mechanism will still be ensured.

Yet another advantageous feature of the present invention involves the locking pin configured as an eccentric member which, in different relative positions with respect to the parallelogram control arm provided with the locking catch, can be fixed to the adjacent parallelogram control arm. As a result, the locking catch and the locking pin, in the locked condition, independently of spacing tolerances between the parallelogram control arms, are ensured in every case to be in contact with one another under tension.

A further aspect of the present invention is a receiving contour of the hook extension, which reaches behind the eccentric locking pen. The configuration of the contour is such that an essentially point contact with the eccentric locking pin takes place. Thereby, a blocking of the locking mechanism and a throwing-out of the locking in the contact area are prevented.

A nose-shaped exterior side of the hook extension is provided, in accordance with the present invention, with a stop bevel for automatic reaching behind the eccentric. This permits an automatic locking of the locking mechanism in the case of an emergency operation. That is, the stop bevel on the locking catch against the restoring force of the restoring spring during the closing of the roof construction is pushed away in the opening direction and behind the eccentric is automatically restored into the locking position by the restoring spring.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
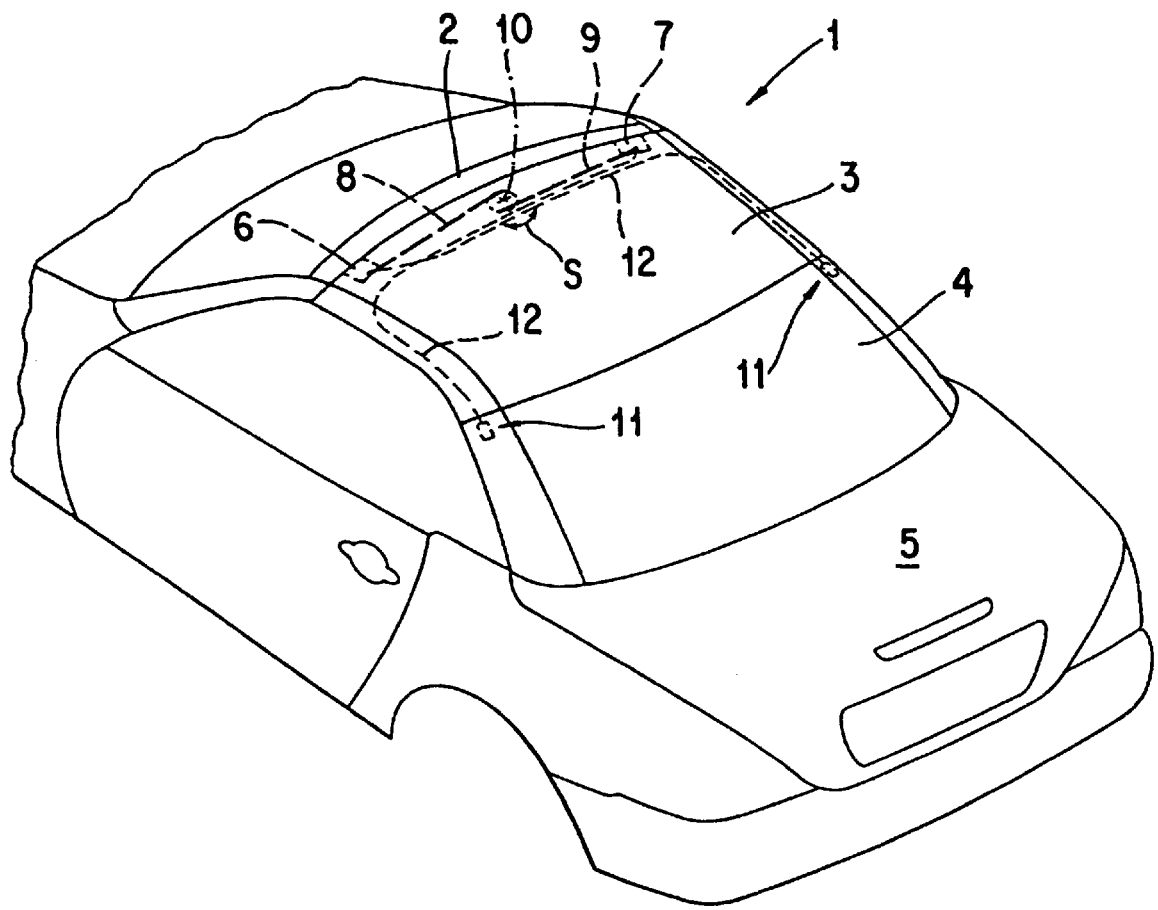
FIG. 1 is a perspective view of one embodiment of a roof construction according to the present invention for a convertible passenger car.

As illustrated in FIG. 1, an open passenger car, e.g. a two-seat convertible 1, has a vehicle interior which, is bounded toward the front by a windshield and a vehicle body frame framing the windshield. An upper frame part of the vehicle body frame is formed by a windshield cross member 2. The windshield cross member 2 is adjoined by a movable roof construction 3, 4 which is illustrated in FIG. 1 in its closed operative position. The roof construction 3, 4 can be sunk into a lowered inoperative position in a storage space of a rear area 5 of the convertible 1.

The movable roof construction has a forward roof part including a stable roof shell 3 which can be fixed to the windshield cross member 2 by hereinafter-described locking device 6 to 10. In the longitudinal direction of the vehicle toward the rear, the forward roof shell 3 is adjoined by a rearward, dimensionally stable roof shell 4 which forms the rearward roof part of the roof construction 3, 4. A rear window is integrated into the rearward roof shell 4. On both sides of the rearward roof shell 4, this roof shell has one stable C-column section respectively. The rearward roof part 4 ends flush in the downward direction with the convertible 1.

In order to change the roof construction 3, 4 from its closed operative position into the opened inoperative position and from this opened inoperative position back into the closed operative position, a control linkage is associated with the two roof shells 3, 4 which on each vehicle side has one identically configured parallelogram linkage respectively. The parallelogram linkage on the two opposite vehicle sides is in each case positioned in the area of the C-column sections of the rearward roof shell 4 in a vehicle-fixed manner.

Figure 2:
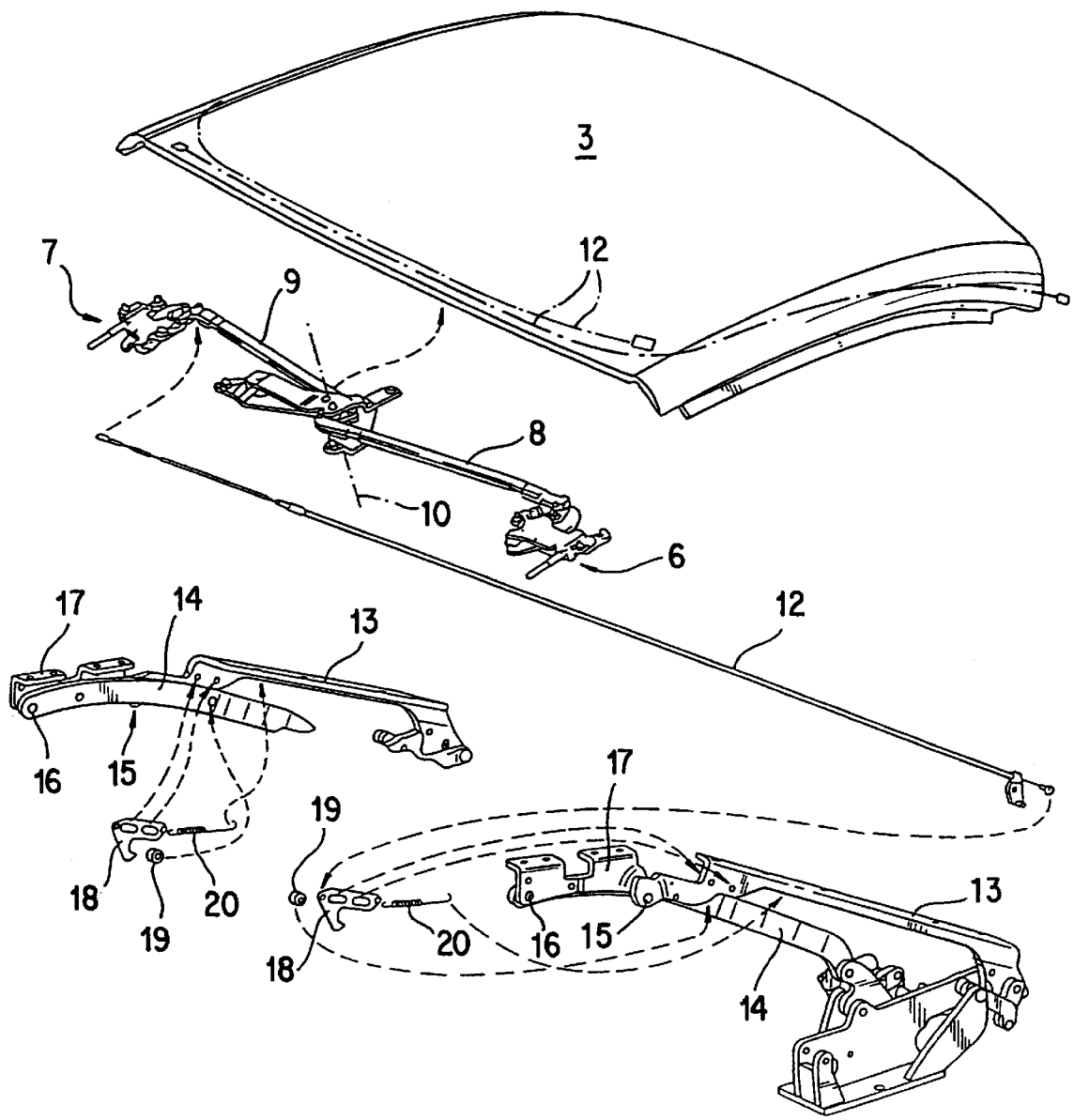
FIG. 2 is an exploded perspective view of the parallelogram linkage, the locking device and the locking mechanism of the roof construction according to the present invention.
Figure 4:
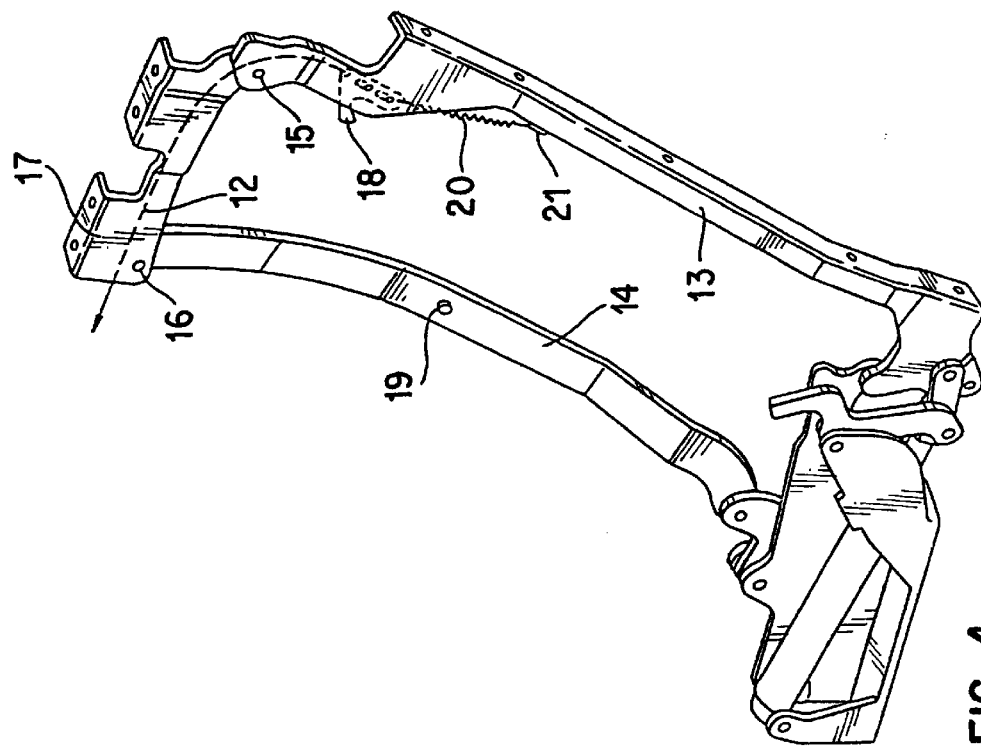
FIG. 4 is a perspective view of the parallelogram linkage of FIG. 3 in a partially opened intermediate position.

As shown in FIG. 1 and 2, each parallelogram linkage has a rearward parallelogram control arm 13 which is fixedly connected with the associated C-column section of the rearward roof shell 4. The rearward parallelogram control arm 13 is linked at a hinge point 15 to a roof shell flange 17 which is fixedly connected with the forward roof shell 3. In the driving direction at a distance in front of the hinge point 15, a forward parallelogram control arm 14 which is disposed in a vehicle-fixed manner on its lower edge, is linked to the flange 17, which is fixedly connected with the roof shell 3, in the area of a forward hinge point 16.

The above-described kinematics of the double-sided parallelogram linkage correspond to the kinematics of the roof construction according to DE 44 45 580 C1 so that, with respect to a detailed description, reference is made to this state of the art.

For swivelling and displacing the two roof shells 3, 4 between their opened inoperative position and their closed operative position, a conventional electrohydraulic driving unit is provided which has a known method of operation. The same applies to the opening and closing of the storage space in the rear area 5 of the convertible 1.

As seen in FIG. 1 and 2, so as to pull the movable roof construction 3, 4 closely onto the windshield cross member 2 and to lock the forward roof shell 3 with the windshield cross member 2, the locking device 6 to 10 has two locks 6, 7 which are mutually spaced along the vehicle width and which are each provided with centering aids and detent pawls. To ensure a simultaneous opening and closing of the two locks 6, 7, the two locks 6, 7 are synchronized with one another. For this purpose, a coupling rod 8, 9 extends from each lock 6, 7 to the vehicle center which are disposed on opposite sides of an axis of rotation 10 of a central rotating lever which is not shown in detail. The opposite exterior ends of the two coupling rods 8, 9 are in an operative connection with the detent pawls of the locks 6, 7. The rotating lever is rotated in the direction indicated by double-headed arrow S in FIG. 1 by a conventional hydraulic cylinder about the approximately vertical axis of rotation 10, whereby the detent pawls and thus the locks 6, 7 can be operated corresponding to the desired opening or locking operation.

A gap resulting in wind noises formed in the closed operative position of the two roof shells 3, 4 particularly at high driving speeds in the area of the joint bordering of the two roof shells 3, 4 is prevented by a locking mechanism provided on the parallelogram linkage located on each side of the vehicle. The locking mechanism in the closed operating position rigidly couples the respective rearward parallelogram control arm 13 and the adjacent forward parallelogram control arm 14 and thus prevents any relative movements between the two parallelogram control arms 13, 14 and therefore also between the forward roof shell 3 and the rearward roof shell 4.

Figure 5:
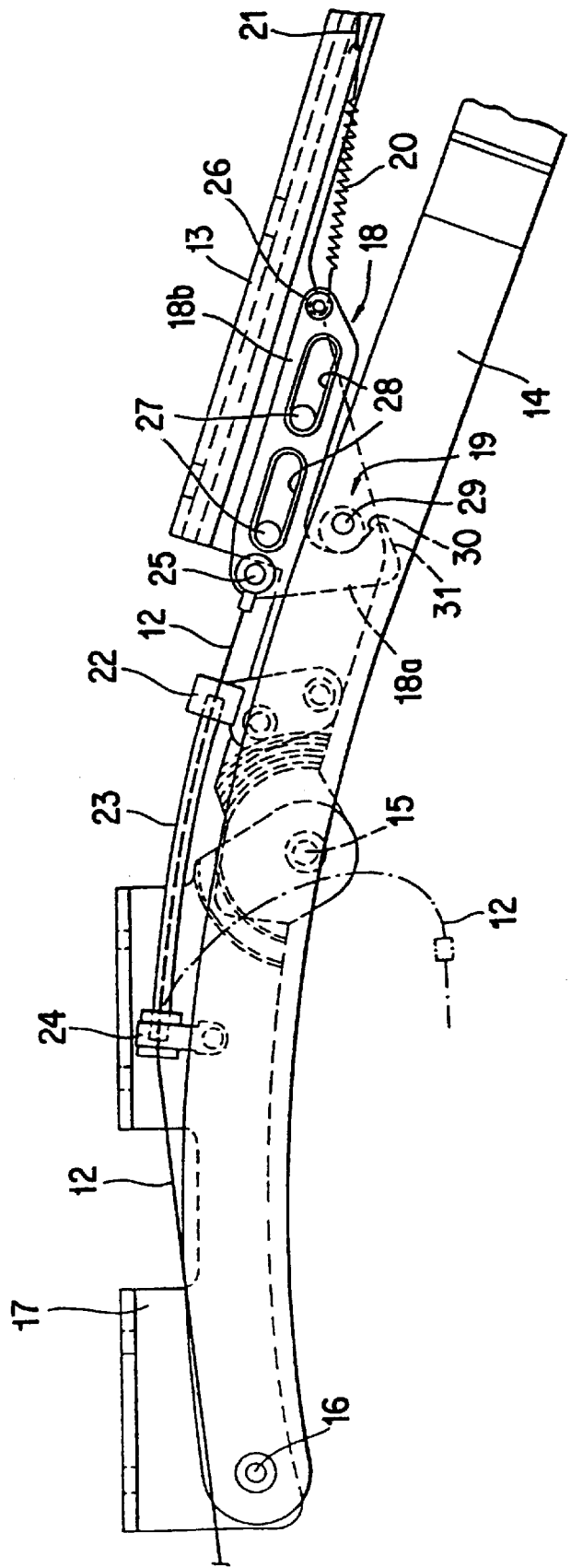
FIG. 5 is an enlarged perspective view of the locking mechanism for blocking the adjacent parallelogram control arms in accordance with the present invention.

As seen in FIG. 5, the locking mechanism has one locking catch 18 on each vehicle side, and therefore also for each pair of parallelogram control arms, which is longitudinally displaceably disposed on the rearward parallelogram control arm 13 in the longitudinal direction of this parallelogram control arm 13. For this purpose, the locking catch 18 has a holding section 18b which is provided with two mutually coaxial oblong holes 28. Two holding pins 27 engage in the oblong holes 28 and are fastened on the rearward parallelogram control arm 13. The locking catch 18 is linearly movable along the length of the oblong holes 28 relative to the holding pins 27 and thus also relative to the parallelogram control arm 13.

Figure 3:
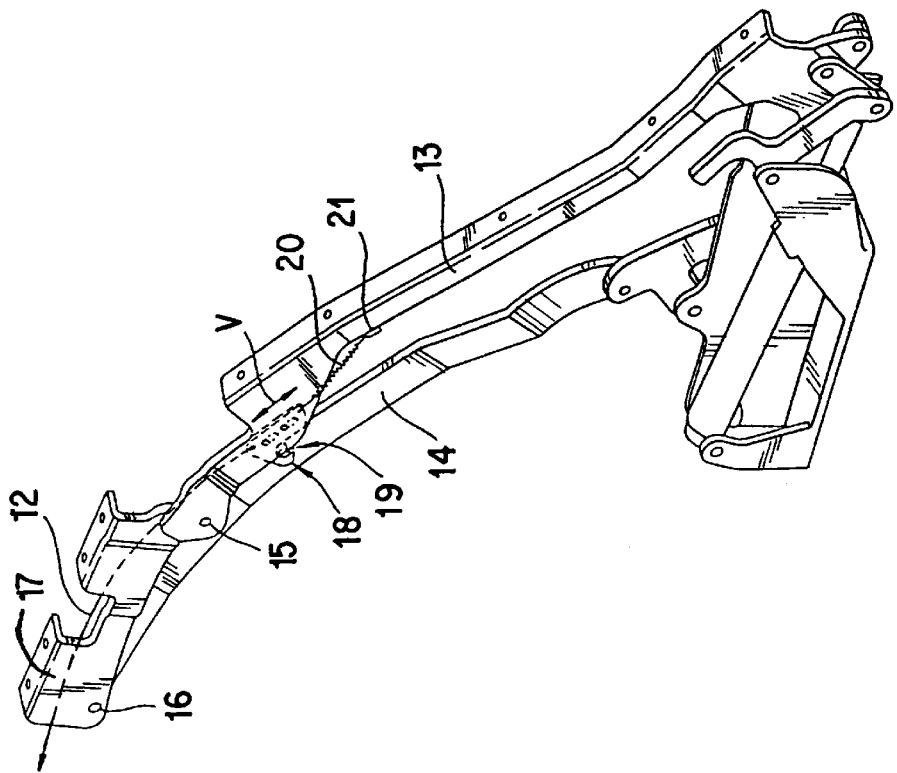
FIG. 3 is an enlarged perspective view of one side of the double-sided parallelogram linkage of FIG. 2, which is on the left side in the driving direction, in the closed operative position of the roof construction.

As shown in FIGS. 3 and 5, on its forward end, the locking catch 18 has a hook extension 18a projecting away from the parallelogram control arm 13. This hook extension 18a takes over the locking function with respect to the adjacent parallelogram control arm 14. For this purpose, an eccentric locking pin 19 is fixed to the forward parallelogram control arm 14, with the hook extension 18a in its locking condition reaching behind the eccentric locking pin 19 as seen in FIGS. 3 and 5. The eccentric locking pin 19 has a cylindrical contact contour for receiving of the hook extension 18a which is eccentrically offset with respect to a fastening axis of a pin section 29 of the locking pin locking pin 19. Depending on the rotating position in which the eccentric is fixed on the forward parallelogram control arm 14, a changed engaging position therefore occurs relative to the hook extension 18a of the locking catch 18. It is therefore possible to compensate tolerances which occur because of different distances between the adjacent parallelogram control arms 13, 14 and to always achieve a precise and braced locking and blocking of relative movements indicated by arrow V in FIG. 3, between the two parallelogram control arms 13, 14.

As seen in FIGS. 3 and 5, a restoring spring 20 holds the locking catch 18 in its locking position, in which the holding pins 27 impact with the assigned front edges of the oblong holes 28. The restoring spring 20 is configured as a spiral tension spring and has a suspension point 26 on the rear-side end of the locking catch 18 which is away from the hook extension 18a. The opposite spring end of the restoring spring 20 is suspended on a spring holder 21 which is fixed on the parallelogram control arm 13. The length of the spring and the distance of the locking catch 18 from the spring holder 21 are mutually sized such that, also in the withdrawn locking position of the locking catch 18, the restoring spring 20 is under prestress in order to avoid rattling noises in the area of the locking mechanism.

As shown in FIGS. 5, 1 and 2, on the forward end of the holding section 18 which is opposite the suspension point 26, the locking catch 18 has a fastening point 25 on which a forward end of a tension-transmitting Bowden cable 12 can be fixed. The Bowden cable 12 extends from the locking catch 18 along the respective lateral roof frame of the forward roof shell 3 in the driving direction toward the front and, in the area of the locking device 6 to 10, is guided transversely along the width of the roof shell 3 such that the forward end of the Bowden cable 12 is in an operative connection with the opposite coupling rod 9 of the lock 7 as seen in FIGS. 1 and 2. The two opposite Bowden cables 12 therefore cross. The guiding of the Bowden cable 12 is selected such that an unlocking of the locks 6, 7 necessarily also causes an unlocking of the two locking catches 18 against the restoring force of the restoring spring 20.

As shown in FIG. 5, both Bowden cables 12 are guided at the level of the respective hinge point 15, in a casing 23 which, on its opposite front ends, is positioned in two holders 22, 24. One holder 22 is assigned to the rearward parallelogram control arm 13, and the other holder 24 is assigned to the flange 17 fixedly connected with the forward roof shell 3. The representation of the Bowden cable 12 by a broken line in FIG. 5 represents the curvature of the Bowden cable 12 in a completely opened condition of the parallelogram linkage. As the result of the Bowden cables, an operation of the locking device 6 to 10 by the hydraulic cylinder automatically also causes a corresponding operation of the locking catches 18 so that no separate drive is required for the locking mechanisms of the two parallelogram linkages.

A lower edge of the holding section 18b changes into a receiving contour of the hook extension 18a which is essentially curved in a U-shaped manner. In its free cross-section, the receiving contour is larger than the contact contour of the eccentric locking pin 19 so that an essentially point contact occurs between the receiving contour and the contact contour. For the same reason, the radii of the U-shaped curvature of the receiving contour are larger than the radius of the contact contour.

An exterior side of the hook extension 18a of each locking catch 18 has a nose with a stop bevel 31 toward the adjacent end of the receiving contour. As the result, a locking of the locking catch 18 with the eccentric locking pin 19 occurs which is independent from the corresponding operation, of the locking catch 18 by the respective Bowden cable 12. This permits an emergency operation which ensures a locking of the locking mechanism also in the case of a failure of the electrohydraulic or hydraulic driving units.

The receiving contour of the hook extension 18a has a compensating edge 30 which expands toward the free end and which, with respect to the displacement axis of the locking catch 18, extends downward at an acute angle. In addition to the enlarged configuration of the receiving contour, this measure also ensures that during the locking of the hook extension 18a with the eccentric locking pin 19, no blocking can occur. On the contrary, the hook extension 18a rests in an essentially point manner against the contact contour of the eccentric locking pin 19. This prevents a throwing-out of the contact areas which could result in rattling noises. In addition, the stop bevel 31 compensates stresses which may occur as a result of loads to the driving dynamics.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A moveable roof construction for a passenger car having a forward, dimensionally stable roof part and a rearward dimensionally stable roof part swivellably disposed about a vehicle-fixed swivelling axis between a closed operative position thereof and an open inoperative position thereof, a parallelogram linkage on each side of the passenger car arranged to displace the forward roof part between a closed operative position thereof and an open inoperative position thereof and having two parallelogram control arms arranged on each side of the passenger car as a fixed component of the rearward roof part, and a locking device for fixing the forward roof part on a windshield cross member of the passenger car, wherein a locking mechanism is operatively arranged between the two parallelogram control arms on each side of the parallelogram linkage, and is coupled via a transmission device to the locking device of the forward roof part on the windshield cross member such that the locking mechanism, for a release of the rearward parallelogram control arm, is unlockable together with an unlocking of the locking device.

2. The roof construction according to claim 1, wherein a locking pin assigned to one of the parallelogram control arms and a locking catch which is longitudinally displaceable on the other of the parallelogram control arms constitute the locking mechanism between the two parallelogram control arms, with a hook extension of the locking catch configured to reach behind the locking pin in the locked condition.

3. The roof construction according to claim 2, wherein a cable pull is coupled to the locking device and constitutes the transmission device for the locking catch, and a restoring spring arranged to load the locking catch in the locking direction is associated with the locking catch.

4. The roof construction according to claim 3, wherein the locking pin is an eccentric member which, in different relative positions with respect to the parallelogram control arm provided with the locking catch, is fixable on the adjacent parallelogram control arm.

5. The roof construction according to claim 4, wherein a receiving contour of the hook extension is configured to have a substantially point contact with the eccentric member.

6. The roof construction according to claim 5, wherein, a compensating edge is provided near an open side of the receiving contour and extends diagonally to a displacement direction of the locking catch toward the outside.

7. The roof construction according to claim 2, wherein the hook extension has a nose-shaped exterior side provided with a stop bevel for reaching behind the locking pin configured as an eccentric member.

* * * * *